United States Patent [19]

Parsons, Jr.

[11] Patent Number: 4,510,966
[45] Date of Patent: Apr. 16, 1985

[54] PLUG VALVE WITH FLOATING STEM SEAL

[75] Inventor: William Parsons, Jr., Boothwyn, Pa.

[73] Assignee: Garlock, Inc., Longview, Tex.

[21] Appl. No.: 479,578

[22] Filed: Mar. 28, 1983

[51] Int. Cl.³ .............................................. F16K 27/12
[52] U.S. Cl. .................................... 137/375; 251/214;
251/312; 251/335 A; 277/83; 277/89;
277/167.5
[58] Field of Search ................. 137/375; 251/335 A,
251/312, 214; 277/83, 88, 89, 167.5, 173, 175,
189

[56] References Cited

U.S. PATENT DOCUMENTS

| 2,797,939 | 7/1957 | Laser | 277/88 |
|---|---|---|---|
| 3,147,961 | 9/1964 | Kowalski | 137/375 |
| 3,522,820 | 8/1970 | Watts et al. | 137/556 |
| 3,703,910 | 11/1972 | Smith | 137/375 |
| 3,916,943 | 11/1975 | Hester et al. | 137/375 |
| 4,061,345 | 12/1977 | Lund | 277/88 |
| 4,258,902 | 3/1981 | Liebert et al. | 277/189 |

FOREIGN PATENT DOCUMENTS 2017265 8/1982 United Kingdom .

OTHER PUBLICATIONS

Bulletin 792-B, "Gar-Seal 100 Series, TFE Butterfly Valves", Garlock, Inc.

Primary Examiner—A. Michael Chambers
Assistant Examiner—Sheri Novack
Attorney, Agent, or Firm—Woodcock Washburn Kurtz Mackiewicz & Norris

[57] ABSTRACT

An improved glandless plug valve of the type in which a tapered plug fits into a tapered bore in a valve body is provided wherein the tapers formed on the plug and in the body coact to form a body seal. A stem seal is also provided. The stem seal comprises a ring-like sealing member confined within mating grooves in the top of the plug and in a floating seal member. The floating seal member is biased downwardly to effect the seal between itself and the ring-like seal member. The bias force is transmitted to the plug valve urging it into engagement with the body of the valve, to provide a good body seal. In a preferred embodiment, the valve and plug are lined such that the valve is suitable for use in connection with corrosive liquids or slurries. The floating seal provides automatic compensation for temperature induced dimensional changes and for wear.

15 Claims, 3 Drawing Figures

PLUG VALVE WITH FLOATING STEM SEAL

FIELD OF THE INVENTION

This invention relates to plug valves for the control of flow of liquids and the like. More particularly, the invention relates to a glandless plug valve which is entirely lined with a corrosion-resistant plastic material and which avoids problems associated with prior art sealing expedients.

BACKGROUND OF THE INVENTION

It is common practice in the valve art to line the bodies of valves with a corrosion-resistant material such as the polytetrafluoroethylene plastic known as Teflon (trademark of DuPont Company). If this is done properly, the entire interior of the valve is prevented from contacting corrosive slurries or fluids, the flow of which can then be controlled by the valve without its untimely demise. However, prior art Teflon-lined valves have not been as successful as might be desired because of the complexity of forming adequate seals in the valve, to prevent leakage both in the line and also around the stem by which the valve plug is rotated from its open to its closed position. Undesirably complex expedients have been tried, such as seals running around the orifices in the plug which mate with the axial flow tubes formed in the valve body. See for example commonly-assigned British Pat. No. 2,017,265. However the seal made according to that patent is very difficult to manufacture. Complex stem seal arrangements have also been tried but, as noted, none have been entirely successful.

In particular, all prior art plug valves of which the present inventor is aware require a gland for the stem seal, which is adjusted to compensate for wear over time. See U.S. Pat. Nos. 3,916,943 to Hester el al and 3,522,820 to Watts et al, both of which acknowledge the problem of stem seal, or "gland" wear. The problem is particularly difficult in the case of lined valves.

As used in this specification and the appended claims, a "plug valve" is to be understood to be a valve in which a tapered plug, having an included angle on the order of 8°, fits tightly within a similarly tapered bore. The plug rotates 90° about the axis of the taper for opening and closing. The provision of the taper means that the valve plug need not have a rigidly fixed axial position with respect to the valve body, so that it can be biased into firm engagement with the bore to effect a good seal between the taper of the plug and that of the bore. This arrangement also permits the valve body and plug to move somewhat with respect to one another, e.g., upon temperature-caused expansion and contraction, without destruction of the seal. This is in clear distinction to other valve types such as butterfly valves, in which a generally circular disk is pivoted about an axis perpendicular to the axis of a generally cylindrical passageway. In order that a seal can be formed, the edge of the circular disk is forced into deforming engagement with the wall of the passage which is typically provided with a resilient wall structure, e.g., a rubber member behind the liner in the case where the butterfly valve is lined with Teflon or the like. Unlike a plug valve, axial up and down motion of the butterfly valve member is not permitted and steps must be taken to insure that thermal expansion and contraction does not destroy the seal of such valves. As in the case of the plug valve, the butterfly valve requires at least one stem seal as well.

One particular type of butterfly valve which is relevant to the present invention is one in which the stem seal comprises a ring fitting into mating annular grooves formed around the stem. If a bottom stem pivot is also used, the same arrangement of a ring fitting within mating grooves can be used. The ring can be urged outwardly by resilient O-rings also located in the mating annular grooves acting on surfaces formed in the annular ring. This structure has been used in butterfly valves made and sold by the assignee of the present invention, as shown in Bulletin 792-B published by the assignee, Garlock, Inc. However, as noted, butterfly valve and plug valve design have generally been treated differently in the art due to the differing ways by which the body seal is made. In particular, a plug valve construction must permit some axial motion of the plug with respect to the bore, if it is to be readily manufacturable, i.e., so that end-to-end manufacturing tolerances can be made reasonable, and also so that expansion and contraction with temperature changes do not destroy the seal. On the other hand, butterfly valves have extremely critical end-to-end tolerances, but the body seal is formed by a deformation of the body of the valve upon engagement thereof with the butterfly disk. Temperature change does not significantly affect the seal. In the tapered plug valve case, the planar contact between the tapered plug and the mating taper of the bore affects the body seal, i.e., the seal of the plug to the body of the valve.

Those skilled in the art will note, as discussed above, that no plug valve design has been entirely adequate to satisfy the needs of the art, particularly with respect to lined plug valves.

OBJECTS OF THE INVENTION

Accordingly, it is an object of the invention to provide an improved lined plug valve.

It is a further object of the invention to provide an improved plug valve in which overly complex gland or stem seal arrangements are avoided, while up and down axial movement of the plug with respect to the bore without destruction of the stem seal or of the body seal of the valve is permitted.

It is a further object of the invention to provide an improved lined plug valve in which all surfaces on the interior of the valve are of corrosion-resistant plastic materials, yet in which the valve can be manufactured relatively simply, without involving parts which have shapes which are unduly difficult to manufacture.

A further object of the invention is to provide a plug valve the seals of which do not require adjustment or replacement due to wear in service.

SUMMARY OF THE INVENTION

The valve according to the present invention satisfies the needs of the art and the objects of the invention mentioned above by its provision of a lined, tapered plug valve in which the stem seal is formed between the valve plug and a floating seal member. The floating seal member is biased into engagement with the valve plug, both forcing it into engagement with the plug to form the stem seal and forcing the plug into sealing engagement with the tapered bore in the body of the valve. Compensation for temperature-caused dimensional changes and for wear are accomplished automatically. In a preferred embodiment, the seal used between the floating seal member and the body of the valve is as discussed above in connection with the prior art butterfly valves, i.e., an annular seal ring fits into mating annular grooves formed in the plug and in the floating seal member, and is forced radially outwardly by compressed resilient O-rings also fit into the mating grooves in the floating seal member and in the plug.

BRIEF DESCRIPTION OF THE DRAWINGS

The invention will be better understood if reference is made to the accompanying drawings, in which.

DESCRIPTION OF THE PREFERRED EMBODIMENTS

Figure 1:
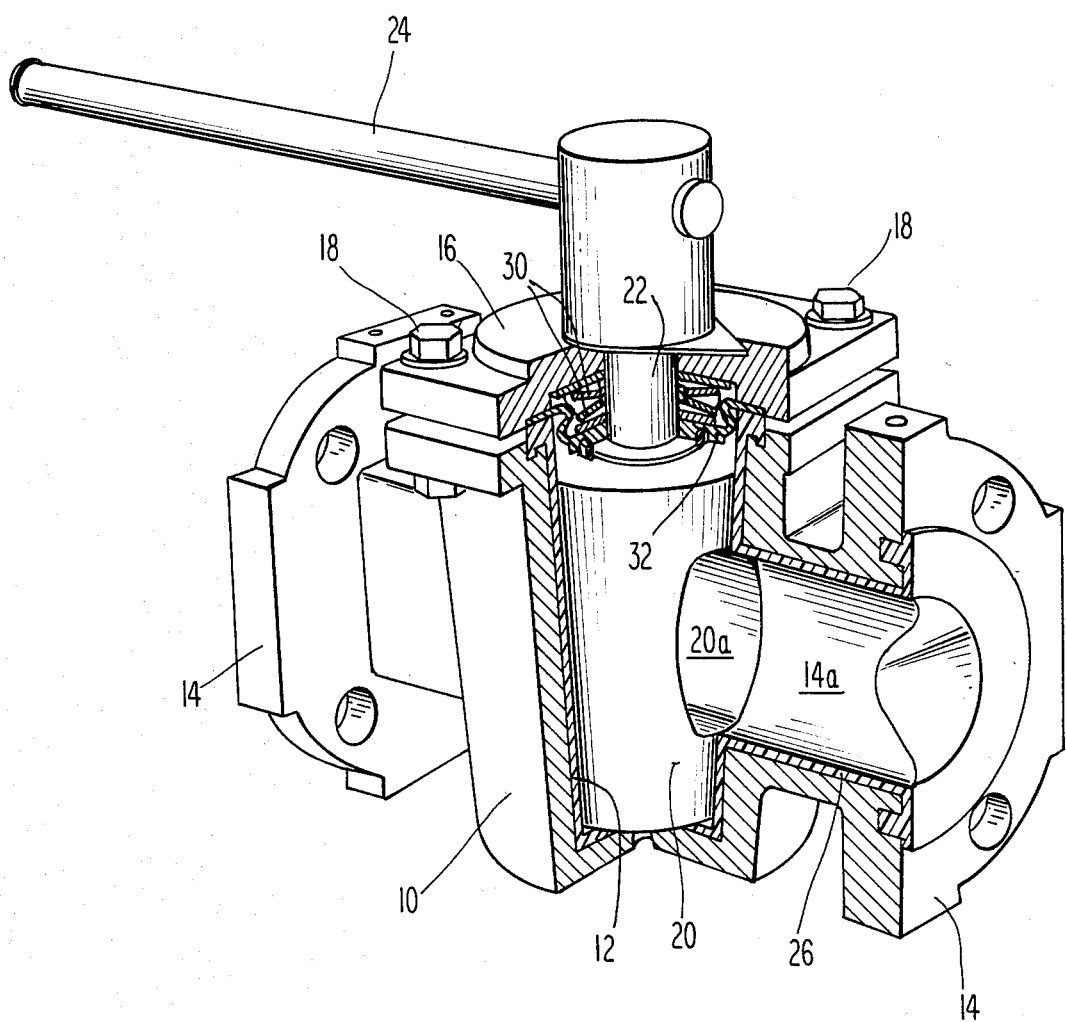
FIG. 1 represents a partial cut-away, three-dimensional view of the valve according to the invention.
Figure 2:
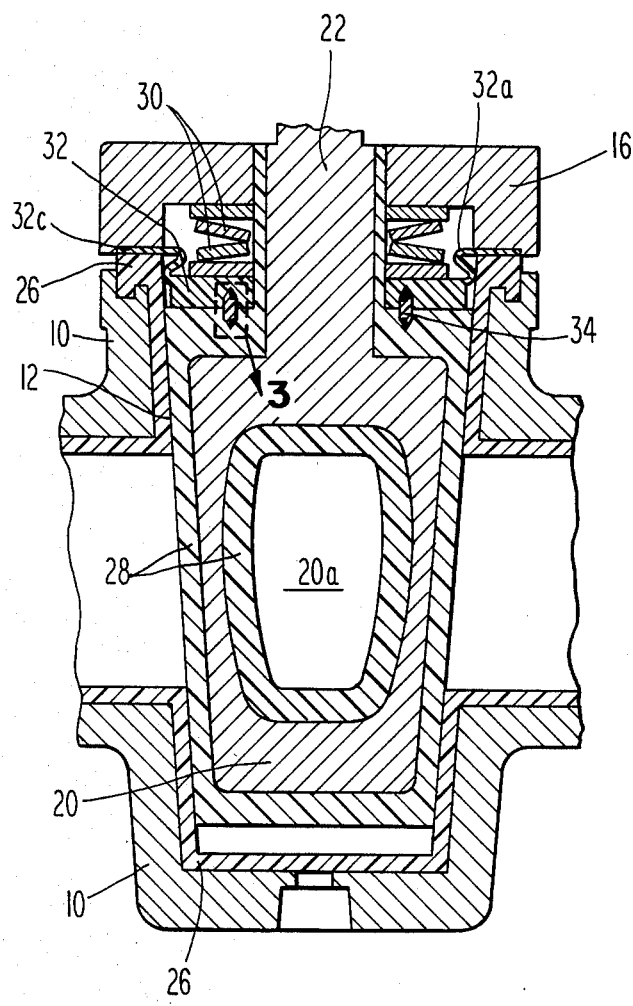
FIG. 2 represents a cross-sectional view of the valve construction according to the invention.

FIG. 1 shows a three dimensional partial cut-away view of the improved plug valve according to the invention. It comprises a body portion 10 comprising a tapered bore 12, flange means 14 for joining with flanges on pipes, and a cap 16 attached to the body portion by bolts 18. Within the bore 12 is a tapered plug 20 having a passage 20a formed therethrough. The plug includes a stem portion 22 which is adapted to be connected to a handle 24 by which it can be rotated to align the passage 20a with the flanges 14 as shown to open the valve or to be rotated 90° with respect to the position shown to close the valve. The body of the valve is lined with a liner 26 formed of a corrosion-resistant plastic which may comprise a so-called PFA material. ("PFA" stands for perfluoroalkoxy, which is an injection moldable plastic material having characteristics similar to Teflon and is also a DuPont trademark.) As shown in FIG. 2, the liner 26 may be formed to engage grooves and the like formed in the valve body to insure that it is firmly fixed thereto after the manufacturing process. As is perhaps more clear from examination of the cross-sectional view of FIG. 2, the plug 20 is also coated with Teflon or a similarly corrosion-resistant plastic material at 28, both on its outside and on the inside of the passageway 20a. In this way, all surfaces of the body 10 and of the plug 20 exposed to any corrosive materials are coated with a corrosion-resistant material, thus greatly increasing the service life of the valve according to the invention.

As discussed above, the way in which a plug valve forms a seal between the plug and the tapered bore in the body of the valve requires that an axial force be exerted on the plug so as to urge its tapered outer contour into engagement with the bore. This is done in the preferred embodiment of the invention by one or more Belleville springs 30 which are axially placed around the stem of the valve under the cap 16 and are compressed by tightening of the bolts 18.

As shown by FIG. 2, the force exerted by the Belleville springs 30 on the plug 20 is transmitted downwardly through an intermediary floating seal member 32 which has a bellows-like construction, having an S-shaped cross-section extending annularly therearound at 32a, which permits relative axial movement of the floating seal member 32, and hence of the plug 20, with respect to the bore 12 without destroying the seal therebetween. This provides the distinct advantage of automatic compensation for temperature-caused relative growth or shrinkage of either the plug or the body of the valve, and for wear of either plug or body due to extended service. This floating seal member 32 may be referred to as a bellows seal member. The bellows seal member 32 is provided with an outwardly extending annular flange 32c which is clamped tightly to the liner 26 by the cap 16, thus completing the lining of the valve. The stem seal between the plug 20 and the floating seal member 32 is formed by another seal member 34 which is of annular or ring-like shape and fits into mating grooves 32b, formed in the bellows seal member 32, and 20b, formed in the Teflon coating 28 of the plug 20.

Figure 3:
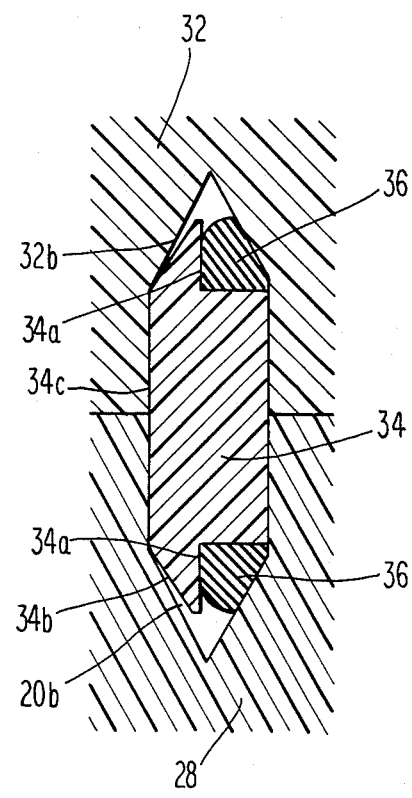
FIG. 3 shows a detailed cross-sectional view of the annular sealing means employed.

FIG. 3 shows in further detail the construction of the stem seal formed by the annular seal member 34 fitting within the mating grooves 32b formed in the bellows seal member 32 and 20b formed in the Teflon coating 28 of the plug 20. As can be seen, the seal ring 34 is sized to fit very closely within the mating grooves 32b and 20b. O-rings 36 are located in grooves formed by notches 34a formed in the annular seal member 34 and are sized to coact with Vee-bottoms of the mating annular grooves so that the O-rings 36 are substantially compressed when the assembly is made, as shown in FIG. 3. These thus tend to exert a radially outward force on the seal ring 34, insuring that it is firmly pressed against the walls of the mating grooves and forms an adequate seal therebetween. In a successfully tested embodiment of the invention the included angle between the walls of the bottoms of both of the grooves is 60°, while the angle of the inclined surface 34b of the "ears" of the ring 34 with respect to the perpendicular is 32° so there is some clearance in this area as shown. The difference in the angles is exaggerated for clarity. In this way, the ears are prevented from interfering with the formation of the seal, which is actually formed by the perpendicular portion 34c of the ring 34 coacting with the like perpendicular portions of the grooves 20b and 32b. In a preferred embodiment the seal ring 34 and the bellows sealing member 32 are both formed of Teflon. The O-rings 36 may be of the tetrafluoroethylene copolymer material known as Viton (also a trademark of DuPont), which exhibits good service characteristics.

As discussed above, the seal structure defined by the seal ring 34 mating with the annular grooves and using the Viton O-rings to force it outwardly is shown in the prior art butterfly valve manufactured by the assignee of the present invention. However, inasmuch as the butterfly of a butterfly valve is not axially biased by means such as the Bellville springs 30 shown here, the butterfly valve must rely on careful control of manufacturing tolerances to insure that the seal between the butterfly and the body of the valve is maintained. Here the Belleville springs exert a biasing force on the floating bellows member, insuring that the stem seal is effectively maintained, thus substantially simplifying the manufacture of the valve according to the invention in a way which is not at all comparable to the manufacture of the prior art butterfly valves.

The drawings of this application depict a successfully tested embodiment of the valve of the invention with its dimensions generally to scale. A 2-inch plug valve, i.e., one having a nominally 2-inch cylindrical orifice formed in the flanges 14, using a plug each side of which forms an angle to the perpendicular of 4°, for a total included angle of 8°, was tested. The valve tested was assembled using three Belleville springs, each rated to provide a maximum force of 1276 pounds at compression to the flat. When assembled, the three springs were each compressed to about 45% of their rated force. The total force exerted downwardly on the plug 20 was thus on the order of 500 pounds, and this was found adequate to form a good seal between the plug and the bore formed in the body of the valve. The Teflon and PFA materials which form the interface between the plug 20 and the bore 12 are relatively "slippery" so that the plug could be rotated to open or close the valve upon application of approximately 20-30 foot-pounds torque to the stem 22. The construction of the valve of the invention is such that this figure does not change noticeably with changes in temperature. The valve constructed as above was tested for 15,000 open and close cycles at 150 psi and ambient temperature, then 10,000 further cycles at 400° F. and 150 psi, then an additional 2000-3000 open and close cycles at 200-300 psi and ambient temperature. The valve tested exhibited no leakage throughout this extensive test period.

Those skilled in the art will recognize that the novel design of the valve of the invention provides several significant advantages. It is relatively easy to manufacture inasmuch as no unduly complicated sealing shapes need be machined, with the possible exception of the floating seal member 32. This, however, can be relatively easily formed on a lathe. Formation of the tapers provides no difficulty and is in any event required of any plug valve. The fact that the seal member 32 is effectively axially floating provides not only automatic temperature compensation of the valve without destruction or failure of the stem seal, but also eliminates the requirement of adjustable or replaceable stem sealing glands; compensation for wear of both the stem seal and body seal is made automatically. The use of the Belleville springs to compress the plug into the bore, to provide a good body seal between the plug and the bore, and also to insure that a good stem seal between the plug and the floating seal member is formed by the sealing member 34, simplifies and reduces the cost of the valve assembly according to the invention. Accordingly, it should be recognized that various modifications and improvements can be made to the valve structure disclosed, and that these are within the scope of the invention, which should therefore not be construed to be limited by the above exemplary disclosure but only by the following claims.

I claim:

1. In a plug valve of the type comprising a tapered plug biased into engagement with a correspondingly tapered bore formed in a valve body, whereby a seal is formed between said plug and said bore, said plug being rotatable between open and closed positions by means of a stem extending out of said body, a stem seal additionally being provided, the improvement comprising said stem seal being formed by a ring seal member captured in mating annular grooves formed in said plug and in a floating seal member, said floating seal member being biased axially into engagement with said ring seal member and with said plug, whereby axial movement of said plug does not destroy said stem seal, and said ring seal member being biased radially outwardly into engagement with said floating seal member and with said plug.

2. The valve of claim 1 wherein spring means provides bias urging said plug into engagement with said bore and urging said floating seal member into engagement and with said ring seal and with said plug.

3. The valve of claim 2 wherein said spring means comprises at least one Belleville spring forced into engagement with said floating seal member by a cap attached to the body of said valve.

4. The valve of claim 1 wherein said valve is lined with corrosion-resistant material.

5. The valve of claim 1 wherein said floating seal member comprises a circumferentially extending bellows structure whereby axial movement of said floating seal member and said plug is permitted without destruction of said stem seal.

6. The valve of claim 1 wherein said ring seal member captured in said mating annular grooves formed in said plug and said floating seal member is urged radially outwardly by resilient means.

7. The valve of claim 6 wherein said resilient means urging said seal member radially outwardly is resilient O-ring members.

8. An improved stem seal for a tapered plug valve comprising a ring seal member confined within mating annular grooves formed in the plug of said valve and in a floating seal means, said floating seal means being axially biased into engagement with said ring seal member, whereby axial motion of said plug may be accommodated without destruction of said stem seal, wherein said floating seal means is biased into engagement with said ring seal member by bias means urging said plug into a tapered bore in said valve, and wherein said ring seal member is biased radially outwardly with respect to the axis of said stem by means confined within said annular grooves together with said ring seal member.

9. The valve of claim 8 wherein said axial biasing is accomplished by Belleville spring washers confined under a cap attached to the body of said valve.

10. The seal of claim 8 wherein said radically outward bias is provided by confined resilient ring members.

11. A plug valve comprising a tapered plug fitting into a tapered bore in a valve body, said plug having a transverse passage formed therethrough for mating with inlet and outlet ports formed in said body when said valve is in the open position, said plug being rotatable by a stem extending out of said body along the axis of said tapered bore to open and close said valve, biasing means being provided to urge said plug into engagement with said tapered bore, said biasing means further urging an axially floating stem seal means into engagement with said plug, mating circumferential grooves being formed in said plug and in said floating seal means and a generally circular stem seal ring being located in said mating grooves, said seal ring being urged radially outwardly in said mating circumferential grooves by O-rings confined in each of said grooves, whereby said biasing means urges said floating seal means and said seal ring axially into engagement with said plug and said O-rings urge said seal ring radially outwardly into engagement with said plug and with said floating seal means, whereby said stem seal ring seals said plug to said floating seal means, so that axial movement of said plug with respect to said bore does not destroy the stem seal provided by said seal ring.

12. The plug valve of claim 11 wherein said floating seal means is of bellows construction whereby axial movement thereof is permissible without destroying said stem seal.

13. The plug valve of claim 11 wherein all surfaces of said valve body and said plug which can contact a fluid passing through said valve are coated with a corrosion-resistant material.

14. The valve of claim 13 wherein said floating seal means and said seal ring are formed of said corrosion-resistant material as well.

15. The valve of either of claims 13 or 14 wherein said corrosion-resistant material is a tetrafluoroethylene material.

* * * * *